(12) United States Patent
Okuda

(10) Patent No.: US 9,631,109 B2
(45) Date of Patent: Apr. 25, 2017

(54) RECORDING METHOD AND INK SET

(71) Applicant: Seiko Epson Corporation, Tokyo (JP)

(72) Inventor: Ippei Okuda, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/090,844

(22) Filed: Apr. 5, 2016

(65) Prior Publication Data

US 2016/0289479 A1   Oct. 6, 2016

(30) Foreign Application Priority Data

Apr. 6, 2015  (JP) ................................ 2015-077473
Aug. 11, 2015  (JP) ................................ 2015-158713

(51) Int. Cl.
*B41J 2/015* (2006.01)
*C09D 11/54* (2014.01)
*B41J 2/21* (2006.01)

(52) U.S. Cl.
CPC ............. *C09D 11/54* (2013.01); *B41J 2/2114* (2013.01)

(58) Field of Classification Search
None
See application file for complete search history.

(56) References Cited

U.S. PATENT DOCUMENTS

2004/0092621 A1   5/2004 Kataoka et al.

FOREIGN PATENT DOCUMENTS

| JP | 2003-266932 A | 9/2003 |
| JP | 2010-115854 A | 5/2010 |

*Primary Examiner* — Matthew Luu
*Assistant Examiner* — Tracey McMillion
(74) *Attorney, Agent, or Firm* — Harness, Dickey & Pierce, P.L.C.

(57) ABSTRACT

According to the invention, there is provided a recording method including adhering a reaction liquid to a recording region of a recording medium, the reaction liquid containing a reagent which causes aggregation or thickening of a colored ink composition; adhering the colored ink composition to the recording region to which the reaction liquid has been adhered, the colored ink composition containing a resin and a coloring material; and adhering a clear ink composition which contains a resin, to the recording region to which the reaction liquid has been adhered, in which a resin which causes a volume of a calcium acetate aqueous solution of 0.085 mol/kg to be equal to or smaller than 7 mL is contained as the resin contained in the colored ink composition, the calcium acetate aqueous solution being required for aggregating a liquid of 3 mL, which contains the resin so as to have a content of 1 mass %.

20 Claims, 1 Drawing Sheet

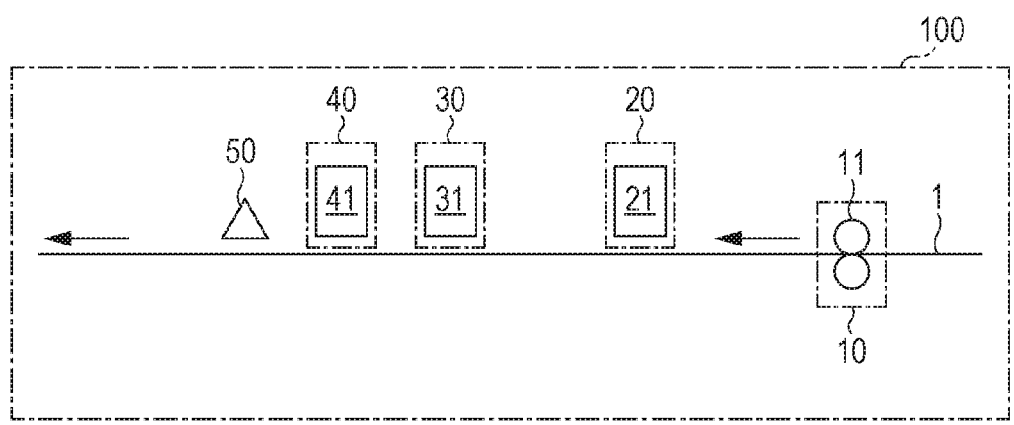

RECORDING METHOD AND INK SET

BACKGROUND

1. Technical Field

The present invention relates to a recording method and an ink set used in the recording method.

2. Related Art

In the related art, an ink jet recording method in which an image is recorded on a recording medium by discharging a fine ink droplet from a nozzle of a recording head of an ink jet recording apparatus has been known. Recently, an ink jet recording method has been used in recording of an image on an ink low-absorbable recording medium (for example, art paper or coated paper) or an ink non-absorbable recording medium (for example, a plastic film), in addition to recording of an image on a recording medium (for example, plain paper) which has excellent ink absorbency. As an ink used in such recording on the ink low-absorbable or ink non-absorbable recording medium, a use of an aqueous resin ink composition containing a resin emulsion is examined from a viewpoint of the global environment, safety for a human, or the like.

For example, JP-A-2003-266932 and JP-A-2010-115854 disclose an ink jet recording type printing method using an aqueous ink set. The aqueous ink set includes a color ink, a resin ink, and a reaction ink containing a reagent which causes constituents of the color ink and the resin ink to be aggregated with each other. In JP-A-2003-266932 and JP-A-2010-115854, it is disclosed that according to the printing method, regarding an image recorded on an ink non-absorbable or ink low-absorbable recording medium, the reagent causes the constituents of the color ink or the resin ink to be aggregated with each other, and thus a recording which is excellent in color-development properties and abrasion resistance is obtained.

However, in the printing method disclosed in JP-A-2003-266932 and JP-A-2010-115854, in an ink non-absorbable or ink low-absorbable recording medium, a cohesive force between the constituents of the color ink and the resin ink may be insufficient, and thus, deterioration in image quality or deterioration in durability of a recorded image may occur.

In a recorded image on the ink non-absorbable or ink low-absorbable recording medium, low odor or excellent glossiness is important from a viewpoint of quality.

SUMMARY

An advantage of some aspects of the invention is to provide a recording method of allowing an image having excellent image quality and durability to be recorded on an ink non-absorbable or ink low-absorbable recording medium. Further, an advantage of some aspects of the invention is to provide a recording method of allowing an image which has excellent glossiness and low odor in addition to excellent image quality and durability, to be recorded.

The invention can be realized in the following aspects or application examples.

Application Example 1

According to an aspect of the invention, there is provided a recording method which includes adhering a reaction liquid to a recording region of a recording medium, the reaction liquid containing a reagent which causes aggregation or thickening of a colored ink composition; adhering the colored ink composition to the recording region to which the reaction liquid has been adhered, the colored ink composition containing a resin and a coloring material; and adhering a clear ink composition which contains a resin, to the recording region to which the reaction liquid has been adhered, in which a resin which causes a volume of a calcium acetate aqueous solution of 0.085 mol/kg to be equal to or smaller than 7 mL is contained as the resin contained in the colored ink composition, the calcium acetate aqueous solution being required for aggregating a liquid of 3 mL, which contains the resin so as to have a content of 1 mass %.

A resin having high reactivity with the reagent contained in the reaction liquid is used as the resin contained in the colored ink composition, and thus, the resin contained in the colored ink composition, and the reagent react with each other rapidly. Thus, a material which has improved image quality of a recorded image and has excellent odor is obtained. Since the resin contained in the colored ink composition is aggregated, and thus fine ruggedness occurs in a surface of the recorded image, durability of the image tends to be damaged. If the resin contained in the colored ink composition is aggregated so as to become large, glossiness (OD) may be deteriorated. Thus, as in the recording method according to Application Example 1, it is possible to significantly improve durability or glossiness of an image by using the clear ink composition which contains the resin.

Application Example 2

In the recording method according to Application Example 1, a resin which causes a volume of a calcium acetate aqueous solution of 0.085 mol/kg to be equal to or greater than 5 mL may be contained as the resin contained in the clear ink composition. The calcium acetate aqueous solution may be required for aggregating a liquid of 3 mL, which contains the resin so as to have a content of 1 mass %.

According to the recording method of Application Example 2, a resin having low reactivity with the reagent which is contained in the reaction liquid is used as the resin contained in the clear ink composition. Thus, it is possible to reduce the occurrence of problems (that is, deterioration in durability of an image or deterioration in glossiness thereof) due to aggregation of the resin.

Application Example 3

In the recording method according to Application Example 1 or 2, a resin in which a glass transition temperature is equal to or higher than 0° C. may be contained as the resin contained in the clear ink composition.

Application Example 4

In the recording method according to any one of Application Examples 1 to 3, an average particle diameter in the resin contained in the clear ink composition may be equal to or smaller than 200 nm.

Application Example 5

In the recording method according to any one of Application Examples 1 to 4, adhering of the colored ink composition may be started within 20 seconds from the completion of the reaction liquid adhering.

Application Example 6

In the recording method according to any one of Application Examples 1 to 5, the maximum adhering amount of the reaction liquid to the recording region may be from 0.2 mg/inch$^2$ to 3 mg/inch$^2$.

Application Example 7

In the recording method according to any one of Application Examples 1 to 6, at least one selected from a group of multivalent metal salts and organic acids may be contained as the reagent.

Application Example 8

In the recording method according to any one of Application Examples 1 to 7, the content of the resin contained in the colored ink composition may be from 0.5 mass % to 13 mass %. The content of the resin contained in the clear ink composition may be from 1 mass % to 17 mass %. The content of the reagent contained in the reaction liquid may be from 0.1 mol/kg to 1.5 mol/kg.

Application Example 9

In the recording method according to any one of Application Examples 1 to 8, the volume of the calcium acetate aqueous solution for the resin contained in the clear ink composition may be larger than the volume of the calcium acetate aqueous solution for the resin contained in the colored ink composition. The volume of the calcium acetate aqueous solution of 0.085 mol/kg may be required for aggregating the liquid of 3 mL which contains the corresponding resin so as to have a content of 1 mass %.

Application Example 10

In the recording method according to any one of Application Examples 1 to 9, each of the colored ink composition and the clear ink composition may be discharged from an ink jet recording head and be adhered to the recording medium.

Application Example 11

According to another aspect of the invention, there is provided an ink set which is used in the recording method according to any one of Application Examples 1 to 10. The ink set includes the reaction liquid, the colored ink composition, and the clear ink composition.

BRIEF DESCRIPTION OF THE DRAWING

The invention will be described with reference to the accompanying drawings, wherein like numbers reference like elements.

FIGURE is a schematic diagram illustrating an example of an image recording apparatus used for a recording method according to an embodiment.

DESCRIPTION OF EXEMPLARY EMBODIMENTS

Hereinafter, a preferred embodiment will be described. The embodiment which will be described below is used for describing an example of the invention. The invention is not limited to the following embodiment and may include various modification examples conducted in a range without deviating from the gist of the invention.

1. Recording Method

According to an embodiment, there is provided a recording method including (1) a reaction liquid adhering process, (2) a colored ink composition adhering process, and (3) a clear ink composition adhering process. In (1) the reaction liquid adhering process, a reaction liquid containing a reagent for aggregation or thickening of a colored ink composition is adhered to a recording region of a recording medium. In (2) the colored ink composition adhering process, a colored ink composition containing a resin and a coloring material is adhered to the recording region to which the reaction liquid has adhered. In (3) the clear ink composition adhering process, a clear ink composition containing a resin is adhered to the recording region to which the reaction liquid has adhered. A resin which causes a volume of a calcium acetate aqueous solution of 0.085 mol/kg to be equal to or smaller than 7 mL is contained as the resin contained in the colored ink composition, the calcium acetate aqueous solution is required for aggregating a liquid of 3 mL, which contains the resin so as to have a content of 1 mass %.

In the invention, "an image" indicates a recorded pattern which is formed from a dot group, and includes a text print and a solid image. The "solid image" means a solid image pattern. The solid image pattern is an image in which dots are recorded in all pixels (which is the smallest recording unit region defined by recording resolution), and a recording region of a recording medium is covered with an ink so as to cause the ground of the recording medium not to be viewed.

The recording method according to the embodiment will be described below in detail for each of the processes thereof.

1.1. Reaction Liquid Adhering Process 1.1.1. Description for Processes

In the reaction liquid adhering process, a reaction liquid containing a reagent for aggregation or thickening of a colored ink composition is adhered to a recording region of a recording medium. If the reagent is adhered to the recording region of a recording medium in advance, and the reagent and a colored ink composition are brought into contact with each other, the resin contained in the colored ink composition, and the reagent react with each other rapidly because a resin contained in the colored ink composition is a resin having high reactivity with the reagent. If the reaction is performed, a state where a colorant or the resin is dispersed in the colored ink composition is disturbed, and the colorant and the resin are aggregated. The obtained aggregate impedes permeation of the colorant into the recording medium. Thus, it is considered that such a resin is excellent from a viewpoint of improvement of image quality of a recorded image.

In the embodiment, the recording medium which is a printing target is not particularly limited. However, recording on an ink non-absorbable or ink low-absorbable recording medium is preferable. In the ink non-absorbable or ink low-absorbable recording medium, a reaction liquid is hardly permeated into the inside of the recording medium, and the reagent remains on the surface of the recording medium. Thus, image quality of a recorded image is significantly deteriorated and durability of the recorded image is significantly deteriorated, in a case where a cohesive force between constituents of the colored ink composition and the clear ink composition is insufficient. Accordingly, the invention is particularly effective for the ink non-absorbable or ink low-absorbable recording medium. The ink low-absorbable recording medium which absorbs an ink a little is more preferable because good image quality is obtained if the colored ink composition or the clear ink composition is adhered as fast as possible after the reaction liquid adhering process.

In this specification, "an ink non-absorbable or ink low-absorbable recording medium" indicates a recording medium having properties in which any portion of an ink composition is not absorbed or the ink composition is hardly absorbed. Quantitatively, the ink non-absorbable or ink low-absorbable recording medium indicates "a recording medium in which an absorbed water amount from a start of contact until 30 msec$^{1/2}$, in the Bristow method is equal to or smaller than 10 mL/m$^2$". The Bristow method is a method which is used most widely as a measuring method of a liquid absorbing amount for a short term. The Bristow method is employed in Japan Technical Association of the Pulp and Paper Industry (JAPAN TAPPI). Details of a test method are described in "Paper and board-Test of water absorptiveness-Bristow method" Standard No. 51 of "Paper and Pulp test method, JAPAN TAPPI, 2000". An ink absorbable recording medium indicates a recording medium which does not correspond to the ink non-absorbable or ink low-absorbable recording medium.

Examples of the ink non-absorbable recording medium include a plastic film in which an ink absorptive layer is not provided, a medium in which a base such as paper is coated with plastics, a medium to which a plastic film is attached. Examples of plastics referred herein include polyvinyl chloride, polyethylene terephthalate, polycarbonate, polystyrene, polyurethane, polyethylene, and polypropylene.

As the ink low-absorbable recording medium, a recording medium in which a coating layer for accepting an ink is provided on a surface is exemplified. For example, a printing paper such as art paper, coated paper, and matted paper is exemplified as a medium in which paper is provided as a base. In a case where a plastic film is used as a base, a medium in which a surface of polyvinyl chloride, polyethylene terephthalate, polycarbonate, polystyrene, polyurethane, polyethylene, polypropylene, and the like is coated with hydrophilic polymer, a medium in which particles of silica, titanium, and the like are coated along with a binder, and the like are exemplified.

As a method of adhering the reaction liquid to a recording medium, for example, any of spin coating, spray coating, gravure roll coating, reverse roll coating, bar coating, an ink jet method, and the like may be used. However, the ink jet method is preferably used because of being possible to control an applied amount of the reaction liquid and to form a layer of the reaction liquid to be thin.

In a case where the reaction liquid is adhered to a recording medium by using the ink jet method, adhering with a droplet amount of 10 ng/dot or smaller at the resolution of 600×600 dpi or greater is preferably performed. Adhering of the reaction liquid under such recording conditions allows uniform adhering even when the small amount of the reaction liquid is adhered. Thus, such conditions are preferable.

In a case where the reaction liquid is adhered to a recording medium by using the ink jet method, either of the following forms, that is, a form in which relative scanning of a line-type ink jet head and a recording medium is performed one time by using the head, so as to perform adhering, a form in which adhering is performed by using a multi-path method for the head and the recording medium, which uses a serial type ink jet head, may be provided. However, from a viewpoint of a rapid recording rate, the former is preferable.

The maximum adhering amount of the reaction liquid to the recording region is preferably from 0.2 mg/inch$^2$ to 3.0 mg/inch$^2$, and more preferably from 0.5 mg/inch$^2$ to 2.0 mg/inch$^2$. Since the resin contained in the colored ink composition has high reactivity with the reagent, it is possible to sufficiently disturb a state where the colorant or the resin is dispersed in the colored ink composition, even when the maximum adhering amount of the reaction liquid to the recording region is small as in the above range.

In order to improve wettability of the reaction liquid for the recording medium before the reaction liquid adhering process, a surface modification process of performing surface modification on the recording medium may be performed. For example, the surface modification is performed so as to cause the wet tension index of the surface of an ink non-absorbable or ink low-absorbable recording medium to be equal to or greater than 40 mN/m. Thus, it is possible to improve wet spreadability of the reaction liquid and to uniformly adhere the reaction liquid to the recording medium. Here, the "wet tension index" is an index of wet tension measured based on "Plastics-Film and sheeting-Determination of wetting tension (JIS K6768:1999).

Such a surface modification process is not particularly limited. For example, a corona treatment, an atmospheric pressure plasma treatment, a flame treatment, an ultraviolet radiation treatment, a solvent treatment, an adhering treatment of a resin liquid (for example, a primer treatment), and the like are exemplified. These treatment methods may be performed by using a well-known apparatus.

A drying process after the reaction liquid adhering process may be included. In the drying process, the reaction liquid which is adhered to the recording region of the recording medium is dried. In this case, drying is preferably performed to an extent of not feeling stickiness when contact with the reaction liquid adhered to the recording region of the recording medium occurs. The drying process of the reaction liquid may be performed in a manner of air drying, or performed in a manner of drying with heating. A heating method of the reaction liquid is not particularly limited. However, for example, a heat press method, a normal pressure steam method, a high pressure steam method, a thermo-fixed method, and the like are exemplified. As a heat source for heating, for example, an infrared ray (lamp) is exemplified.

1.1.2. Reaction liquid

Next, a reaction liquid used in the reaction liquid adhering process will be described. The reaction liquid used in the embodiment contains a reagent for aggregation or thickening of the colored ink composition, and other components. Components contained in the reaction liquid which is used in the embodiment, and components which may be contained will be described below in detail.

Reagent

The reaction liquid used in the embodiment contains a reagent which reacts with resin particles contained in the colored ink composition so as to cause aggregation or thickening. Examples of the reagent include a multivalent metal salt, organic acid, and a cationic compound (cationic resin, cationic surfactant, and the like). The reagent may be singly used or used in combination of two or more types. Among the reagents, from a viewpoint of excellent reactivity with the resin contained in the colored ink composition, at least one reagent selected from a group which is formed by a multivalent metal salt and organic acid is preferably used.

As the multivalent metal salt, a compound which is configured from a multivalent (bivalent or more) metal ion and an anion bonded to the multivalent metal ion, and is soluble in water may be used. Specific examples of the multivalent metal ion include bivalent metal ions such as $Ca^{2+}$, $Cu^{2+}$, $Ni^{2+}$, $Mg^{2+}$, $Zn^{2+}$, and $Ba^{2+}$; and trivalent metal ions such as $Al^{3+}$, $Fe^{3+}$, and $Cr^{3+}$. Examples of the anion include $Cl^-$, $I^-$, $Br^-$, $SO_4^{2-}$, $ClO_3^-$, $NO_3^-$, $HCOO^-$, and $CH_3COO^-$. Among the multivalent metal salts, from stability of the reaction liquid or the reactivity as the reagent, calcium salts and magnesium salts are preferable.

Examples of organic acid desirably include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid; derivatives of the above compounds; and salts of the above materials. The organic acid may be singly used or be used in combination of two or more types.

Examples of the cationic resin include a cationic urethane resin, a cationic olefin resin, and a cationic allylamine resin.

As the cationic urethane resin, well-known materials may be appropriately selected and used. As the cationic urethane resin, a commercial product may be used. For example, the following materials may be used: Hydran CP-7010, CP-7020, CP-7030, CP-7040, CP-7050, CP-7060, and CP-7610 (merchandise name, manufactured by DIC Corporation); Superflex 600, 610, 620, 630, 640, and 650 (merchandise name, manufactured by DKS Co., Ltd.); and urethane emulsion WBR-2120C and WBR-2122C (merchandise name, manufactured by Taisei Fine Chemical Co., Ltd.).

The cationic olefin resin has olefin such as ethylene and propylene, as a structure skeleton. As the cationic olefin resin, well-known materials may be appropriately selected and used. The cationic olefin resin may be in an emulsion state of being dispersed in a solvent which includes water, an organic solvent, or the like. As the cationic olefin resin, a commercial product may be used. For example, Arrow Base CB-1200 and CD-1200 (merchandise name, manufactured by Unitika Ltd.) are exemplified.

As the cationic allylamine resin, well-known materials may be appropriately selected and used. Examples of the cationic allylamine resin may include polyallylamine hydrochloride, polyallylamine amide sulfate, allylamine hydrochloride•diallylamine hydrochloride copolymers, allylamine acetate•diallylamine acetate copolymers, allylamine hydrochloride•dimethylallylamine hydrochloride copolymers, allylamine•dimethylallylamine copolymers, polydiallylamine hydrochloride, polymethyl diallyl amine hydrochloride, polymethyl diallyl amine amide sulfate, polymethyl diallyl amine acetate, polydiallyl dimethylammonium chloride, diallylamine acetate•sulfur dioxide copolymer, diallyl methylethyl ammonium ethyl sulfate•sulfur dioxide copolymers, methyl diallyl amine hydrochloride•sulfur dioxide copolymer, diallyl dimethyl ammonium chloride•sulfur dioxide copolymers, and diallyldimethyl ammonium chloride•acrylamide copolymer. As such a cationic allylamine-based resin, a commercial product may be used. For example, the following commercial products may be used: PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (merchandise name, manufactured by Nittobo Medical Co., Ltd.), Hymo Neo-600, Hymoloc Q-101, Q-311, and Q-501, and Hymacs SC-505 and SC-505 (merchandise name, manufactured by Hymo Co., Ltd.).

Examples of the cationic surfactant include primary amine salt-type compounds, secondary amine salt-type compounds, and tertiary amine salt-type compounds, alkyl amine salts, dialkyl amine salts, aliphatic amine salts, benzalkonium salts, quaternary ammonium salts, quaternary alkylammonium salts, alkyl pyridinium salts, sulfonium salts, phosphonium salts, onium salts, and imidazolinium salts. Specific examples of the cationic surfactant include hydrochloride such as laurylamine, Yashiamine, and rosin amine, acetates, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyllauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, and octadecyl dimethyl ammonium chloride.

The content of the reagent may be appropriately determined so as to exhibit the above-described effects. For example, the content of the reagent in 1 kg of a reaction liquid is preferably from 0.1 mol/kg to 1.5 mol/kg, and more preferably from 0.2 mol/kg to 1.3 mol/kg. The content of the reagent is, for example, preferably from 0.5 mass % to 25 mass %, and more preferably from 1 mass % to 20 mass %, with respect to the total mass of the reaction liquid.

Water

The reaction liquid used in the embodiment preferably uses water as the main solvent. The water is a component which adheres the reaction liquid to the recording region of the recording medium, and then is dried so as to be evaporated and scattered. As the water, pure water or ultra-pure water such as ion exchange water, ultrafiltration water, reverse osmotic water, and distilled water, that is, water in which ionic impurities are removed as much as possible is preferable. If water sterilized by ultraviolet ray radiation, addition of hydrogen peroxide, or the like is used, generation of mold or bacteria in a case where the reaction liquid is stored for a long term can be prevented. Thus, such water is desired. The content of the water contained in the reaction liquid may be set to be, for example, equal to or greater than 50 mass %, with respect to the total mass of the reaction liquid.

Organic Solvent

An organic solvent may be added to the reaction liquid used in the embodiment. It is possible to improve wettability of the reaction liquid to the recording medium by adding the organic solvent. As the organic solvent, a solvent similar to an organic solvent exemplified in a colored ink composition (which will be described later) may be used. The content of the organic solvent is not particularly limited. However, the content of the organic solvent may be set to be, for example, from 1 mass % to 40 mass %, with respect to the total mass of the reaction liquid.

Surfactant

A surfactant may be added to the reaction liquid used in the embodiment. It is possible to reduce surface tension of the reaction liquid, and to improve wettability for the recording medium by adding the surfactant. Among surfactants, for example, an acetylene glycol-based surfactant, a silicon-based surfactant, and a fluorine-based surfactant may be preferably used. As a specific example of the surfactant, a surfactant similar to a surfactant exemplified in the colored ink composition (which will be described later) may be used. The content of the surfactant is not particularly limited. However, the content of the surfactant may be set to be, for example, from 0.1 mass % to 1.5 mass %, with respect to the total mass of the reaction liquid.

Other Components

If necessary, a pH adjuster, a corrosion inhibitor•antifungal agent, a rust inhibitor, a chelating agent, and the like may be added to the reaction liquid used in the embodiment.

1.2. Colored Ink Composition Adhering Process

1.2.1. Descriptions for Processes

In the colored ink composition adhering process, a colored ink composition is adhered to the recording region to which the reaction liquid has been adhered, after the above-described reaction liquid adhering process. The colored ink composition contains a resin and a coloring material. Because the resin contained in the colored ink composition has high reactivity with the reagent contained in the reaction liquid, the resin contained in the colored ink composition, and the reagent react with each other rapidly. Thus, the resin is excellent from a point of improving image quality of a recorded image.

In the colored ink composition adhering process, droplets of the colored ink composition are discharged from nozzles of an ink jet recording head, and are adhered to the above-described recording region of the recording medium, which has the reaction liquid adhered thereto, and thereby an image is recorded in the recording region. Thus, an image formed from the colored ink composition is formed in the recording region of the recording medium.

Adhering of the colored ink composition is preferably started within 30 seconds from completion of the reaction liquid adhering. The upper limit value is preferably 20 seconds, more preferably 15 seconds, further preferably 10 seconds, further more preferably 7 seconds, and particularly 5 seconds. The lower limit value is 0 second, preferably 0.05 seconds, more preferably 0.1 seconds, further preferably 0.5 seconds, and particularly preferably second. Adhering of the colored ink composition is started within 30 seconds from completion of adhering of the reaction liquid, and thus the colored ink composition can be adhered to the recording region of the recording medium before the reaction liquid permeates the recording medium. Thus, the reagent contained in the reaction liquid, and the resin contained in the colored ink composition may react with each other rapidly. Accordingly, it is possible to improve more the image quality of a recorded image and to increase a recording rate.

The maximum adhering amount of the colored ink composition to the recording region is preferably from 5 mg/inch$^2$ to 15 mg/inch$^2$. If the maximum adhering amount of the colored ink composition to the recording region is in the above range, a relative ratio of the adhering amount of the reagent contained in the reaction liquid and the adhering amount of the resin contained in the colored ink composition becomes appropriate in the recording region, and the recording rate can be increased. Thus, the above range is preferable.

After the colored ink composition adhering process, a drying process in which the colored ink composition which has been adhered to the recording region of the recording medium may be provided. In this case, drying is preferably performed to an extent of not feeling stickiness when contact with the colored ink composition adhered to the recording region of the recording medium occurs. The drying process of the colored ink composition may be performed in a manner of air drying. However, from a similar viewpoint to the above-described drying process of the reaction liquid, the drying process of the colored ink composition may be performed in a manner of drying with heating. A heating method of the colored ink composition is not particularly limited. However, similar methods to the methods exemplified as the above-described heating method of the reaction liquid are exemplified.

1.2.2. Colored Ink Composition

Next, a colored ink composition used in the colored ink composition adhering process will be described. The colored ink composition used in the embodiment contains a resin, a colorant, and other components. Components contained in the colored ink composition which is used in the embodiment, and components which may be contained will be described below in detail.

Resin

The resin contained in the colored ink composition is a resin which causes a volume of a calcium acetate aqueous solution of 0.085 mol/kg to be equal to or smaller than 7 mL is contained. The calcium acetate aqueous solution is required for aggregating a liquid of 3 mL, which contains the resin so as to have a content of 1 mass %. The required volume is preferably equal to or smaller than 5 mL, more preferably equal to or smaller than 3 mL, further preferably equal to or smaller than 2 mL, and particularly preferably equal to or smaller than 1 mL. The lower limit value of the required volume is preferably equal to or smaller than 0.1 mL, from a viewpoint of easy acquisition. Because such a resin has significantly high reactivity with the above-described reagent, the resin contained in the colored ink composition, and the reagent react with each other rapidly in the recording region of the recording medium. Thus, the state where the colorant or the resin is dispersed in the colored ink composition is disturbed, and the colorant or the resin are aggregated or thickened. Because the obtained aggregate impedes permeation of the colorant into the recording medium, it is possible to prevent occurrence of landing interference or bleeding of the colored ink composition which will been adhered thereafter, and to homogenously draw a line, a fine image, and the like. Thus, it is considered that the resin is excellent from a point of improving the image quality of a recorded image. The resin contained in the colored ink composition, and the reagent react with each other rapidly, and thus it is possible to reduce odor.

Such a resin having high reactivity is not particularly limited. However, it is preferable that (1) an anionic resin in which an anionic functional group is provided on a surface is used, (2) a resin in which an acid value is equal to or greater than 5 mgKOH/g (preferably equal to or greater than 20 mgKOH/g, and more preferably equal to or greater than 40 mgKOH/g) is used, or (3) a self-dispersion resin which is obtained without using an emulsifier. Here, the "anionic resin" refers to a resin in which the entirety of the resin has negative charges. The "self-dispersion resin" refers to a resin which can be dispersed for itself without a need for a dispersant.

Examples of the material of the resin include an acrylic resin, a urethane resin, a polyolefin resin, a polyester resin, a vinyl acetate copolymer resin, and an ionomer resin.

As a form of the resin, a resin particle (resin emulsion) or a water-soluble resin may be used. However, from a point of the above-described effects, the resin particle (resin emulsion) is preferable.

Among the resins, the anionic resin emulsion having the anionic functional group on the surface thereof is preferable because the anionic resin emulsion can improve the reactivity more (reduce the volume relating to the reaction), and can react with the reagent rapidly by electrostatic interaction. Examples of the anionic functional group include a carboxyl group, a sulfonic acid group, and a phosphoric acid group, and a group derived from the above groups.

In the specification, the "acid value" means an amount (mg) of KOH required for neutralizing a resin solid content of 1 g. The "acid value" may be measured by a method described in JIS K0070, for example, a potential-difference titration method.

From a point of sufficient reaction with the reagent, the lower limit value of the solid content of the resin is preferably equal to or greater than 0.1 mass %, more preferably equal to or greater than 0.3 mass %, and particularly preferably equal to or greater than 0.5 mass %, with respect to the total mass of the colored ink composition. From a point of storage stability or discharge stability of the colored ink composition, the upper limit value thereof is preferably equal to or smaller than 13 mass %, more preferably equal to or smaller than 10 mass %, further preferably equal to or smaller than 7 mass %, and particularly preferably equal to or smaller than 5 mass %.

Colorant

The colored ink composition used in the embodiment contains a colorant. From a viewpoint of easy exhibition of the effects of the invention, a pigment or an acid dye may be preferably used as the colorant.

Among pigments, as an inorganic pigment, for example, carbon black, iron oxide, and titanium oxide are exemplified. Carbon black is not particularly limited. However, examples of carbon black include furnace black, lamp black, acetylene black, and channel black (C.I.Pigment Black 7). Examples of commercial products of carbon black include carbon black No. 2300, and 900, MCF88, No. 20B, No. 33, No. 40, No. 45, and No. 52, MA7, MA8, MA100, and No. 2200B (all the above are merchandise name, manufactured by Mitsubishi Chemical Corporation), Carbon Black FW1, FW2, FW2V, FW18, FW200, 5150, 5160, and 5170, Pritex 35, U, V, and 140U, Special Black 6, 5, 4A, 4, and 250 (all the above are merchandise name, manufactured by Degussa AG), Conductex SC, Raven 1255, 5750, 5250, 5000, 3500, 1255, and 700 (all the above are merchandise name, manufactured by Columbian Carbon Japan Ltd), materials manufactured by Columbian Chemicals, Regal 400R, 330R, and 660R, Mogul L, Monarch 700, 800, 880, 900, 1000, 1100, 1300, and 1400, and Elftex 12 (all the above are merchandise name, manufactured by Cabot Corporation).

Examples of an organic pigment include quinacridone-based pigments, quinacridone quinone-based pigments, dioxazine-based pigments, phthalocyanine-based pigments, anthrapyrimidine-based pigments, anthanthrone-based pigments, indanthrone-based pigments, flavanthrone-based pigments, perylene-based pigments, diketopyrrolopyrrole-based pigments, perinone-based pigments, quinophthalone-based pigments, anthraquinone-based pigments, thioindigo-based pigments, benzimidazolone-based pigments, isoindolinone-based pigments, azomethine-based pigments, and azo-based pigments. Specific examples of the organic pigment include the following materials.

Examples of a pigment used in a cyan ink include C.I.Pigment Blue 1, 2, 3, 15, and 15:1, 15:2, 15:3, 15:4, 15:6, 15:34, 16, 18, 22, 60, 65, and 66, C.I.Vat Blue 4, and 60.

Examples of a pigment used in a magenta ink include C.I.Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264, C.I.Pigment Violet 19, 23, 32, 33, 36, 38, 43, and 50.

Examples of a pigment used in a yellow ink include C.I.Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

As pigments used in inks of other colors, such as a green ink and an orange ink, the conventional well-known pigments are exemplified. The pigment may be singly used or be used in combination of two or more types.

As the acid dye, acid dyes of azos, anthraquinones, pyrazolones, phthalocyanines, xanthenes, indigoids, triphenylmethanes and the like are exemplified. Specific examples of the acid dye include C.I. Acid Yellow 17, 23, 42, 44, 79, and 142, C.I. Acid Red 52, 80, 82, 249, 254, and 289, C.I. Acid Blue 9, 45, and 249, and C.I. Acid Black 1, 2, 24, and 94. The acid dye may be singly used or be used in combination of two or more types.

Water

The colored ink composition used in the embodiment preferably uses water as the main solvent. The water is a component which adheres the colored ink composition to the recording region of the recording medium, and then is dried so as to be evaporated and scattered. As the water, pure water or ultra-pure water such as ion exchange water, ultrafiltration water, reverse osmotic water, and distilled water, that is, water in which ionic impurities are removed as much as possible is preferable. If water sterilized by ultraviolet ray radiation, addition of hydrogen peroxide, or the like is used, generation of mold or bacteria in a case where the colored ink composition is stored for a long term can be prevented. Thus, such water is desired. The content of the water contained in the colored ink composition may be set to be, for example, equal to or greater than 50 mass %, with respect to the total mass of the colored ink composition.

Organic Solvent

An organic solvent may be added to the colored ink composition used in the embodiment. Addition of the organic solvent allows the following function to be applied to the ink: a function of improving wettability of the colored ink composition to the recording medium, a function of improving fixability of a recorded image to the recording medium, or a function of preventing drying of a discharge head and improving discharge stability.

The organic solvent is not particularly limited. Examples of the organic solvent include 1,2-alkane diols, polyhydric alcohols (excluding 1,2-alkane diols), pyrrolidone derivatives, and glycol ethers.

Examples of 1,2-alkane diols include 1,2-propanediol, 1,2-butanediol, 1,2-pentanediol, 1,2-hexanediol, and 1,2-octanediol. 1,2-alkane diols has excellent effects of improving the wettability of the colored ink composition for a recording medium and uniformly wet the recording medium. In a case where 1,2-alkane diols are contained, the content of 1,2-alkane diols may be set to be from 1 mass % to 20 mass %, with respect to the total mass of the colored ink composition.

Examples of polyhydric alcohols (excluding 1,2-alkane diols) include ethylene glycol, diethylene glycol, propylene glycol, dipropylene glycol, 1,3-propanediol, 1,4-butanediol, 1,6-hexanediol, trimethylol propane, glycerine. In a case where polyhydric alcohols are contained, the content of polyhydric alcohols may be set to be from 2 mass % to 30 mass %, with respect to the total mass of the colored ink composition.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. The pyrrolidone derivatives function as a good solubilizer for the resin.

Examples of glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol mono isoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethyl pentyl ether, ethylene glycol mono-2-ethyl pentyl ether, ethylene glycol mono-2-ethylhexyl ether, diethylene glycol mono-2-ethylhexyl ether, ethylene glycol mono-2-methyl pentyl ether, diethylene glycol mono-2-methyl pentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These glycol ethers may be singly used or two or more thereof may be mixed and used. Glycol ethers may control wettability and the like of the colored ink composition for a recording medium.

The content of the organic solvent is not particularly limited. However, the content of the organic solvent may be set to be, for example, from 1 mass % to 40 mass %, with respect to the total mass of the colored ink composition.

Surfactant

The colored ink composition according to the embodiment may contain a surfactant. The surfactant has a function of reducing surface tension of an ink and improving wettability for the recording medium. Among surfactants, for example, an acetylene glycol-based surfactant, a silicon-based surfactant, and a fluorine-based surfactant may be preferably used.

The acetylene glycol-based surfactant is not particularly limited. Examples of the acetylene glycol-based surfactant include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all the above are merchandise name, manufactured by Air Products and Chemicals. Inc.), Olfin B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all the above are merchandise name, manufactured by Nissin Chemical Industry Co., Ltd.), and Acetylenol E00, E00P, E40, and E100 (all the above are merchandise name, manufactured by Kawaken Fine Chemicals Co., Ltd.).

The silicon-based surfactant is not particularly limited. A polysiloxane compound is preferably exemplified. The polysiloxane compound is not particularly limited, and for example, polyether-modified organosiloxane is exemplified. Examples of commercial products of polyether-modified organosiloxane include BYK-306, BYK-307, BYK-333, BYK-341, BYK-345, BYK-346, and BYK-348 (all the above are merchandise name, manufactured by BYK Corporation), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all the above are merchandise name, manufactured by Shin-Etsu Chemical Co., Ltd.).

As the fluorine-based surfactant, fluorine-modified polymer is preferably used. As a specific example of the fluorine-modified polymer, BYK-340 (manufactured by BYK-Chemie Japan Corporation) is exemplified.

In a case where the surfactant is contained, the content of the surfactant may be set to be from 0.1 mass % to 1.5 mass %, with respect to the total mass of the colored ink composition.

Other Components

The colored ink composition used in the embodiment may contain a pH adjuster, a corrosion inhibitor•antifungal agent, a rust inhibitor, a chelating agent, and the like, if necessary.

1.3. Clear Ink Composition Adhering Process 1.3.1. Description for Processes

In the clear ink composition adhering process, a clear ink composition containing a resin is adhered to the recording region of the recording medium, after the above-described reaction liquid adhering process. The clear ink composition adhering process may be performed after the reaction liquid adhering process. In addition, the clear ink composition adhering process may be performed after the colored ink composition adhering process, be performed simultaneously with the colored ink composition adhering process, or be performed before the colored ink composition adhering process. From a viewpoint of easy exhibition of the effects of the invention, performing after the colored ink composition adhering process or performing simultaneously with the colored ink composition adhering process is preferable, and performing after the colored ink composition adhering process is more preferable.

Since the resin contained in the colored ink composition has significantly high reactivity with the reagent contained in the reaction liquid, the resin contained in the colored ink composition, and the reagent react with each other rapidly. Thus, the resin is excellent from a point of improving image quality of a recorded image. Meanwhile, a tendency that aggregation or thickening of the resin contained in the colored ink composition causes ruggedness to be easily generated on the surface of a recorded image, and glossiness (OD) or durability of a recorded image is significantly deteriorated is confirmed. As a result obtained by close examination of the inventors, in a case where a resin which is contained in the colored ink composition and has high reactivity is used, a tendency of deterioration in the durability of a recorded image is obviously confirmed. Accordingly, overcoating is performed on a surface of an image recorded with the colored ink composition, by using the clear ink composition containing the resin, and thus it is possible to significantly improve glossiness (OD) or durability of a recorded image. That is, according to the recording method of the embodiment, it is possible to record an image so as to be excellent in image quality and durability.

In the clear ink composition adhering process, droplets of the clear ink composition are discharged from nozzles of the ink jet recording head, and are adhered to the above-described recording region of the recording medium, which has the reaction liquid and/or the colored ink composition adhered thereto, and thus overcoating is performed on the recording region. Accordingly, an overcoated image is formed in the recording region of the recording medium.

The maximum adhering amount of the clear ink composition to the recording region is preferably from 0.5 mg/inch$^2$ to 4 mg/inch$^2$. If the maximum adhering amount of the clear ink composition to the recording region is in the above range, it is possible to reduce the thickness of the overcoat, to reduce a level difference in the surface of a recorded image, and to increase the recording rate. Thus, the above range is preferable.

After the clear ink composition adhering process, a drying process in which the clear ink composition which has been adhered to the recording region of the recording medium may be provided. In this case, drying is preferably performed to an extent of not feeling stickiness when contact with the clear ink composition adhered to the recording region of the recording medium occurs. The drying process of the clear ink composition may be performed in a manner of air drying. However, from a similar viewpoint to the above-described drying process of the reaction liquid, the drying process of the clear ink composition may be performed in a manner of drying with heating. A heating method of the clear ink composition is not particularly limited. However, similar methods to the methods exemplified as the above-described heating method of the reaction liquid are exemplified. In this case, it is possible to increase the recording rate by heating the temperature of the recording medium so as to be equal to or higher than 40° C. (preferably from 45° C. to 80° C.)

1.3.2. Clear Ink Composition

Next, a clear ink composition used in the clear ink composition adhering process will be described. The clear ink composition used in the embodiment contains a resin and other components. Components contained in the clear ink composition which is used in the embodiment, and components which may be contained will be described below in detail.

Resin

The resin contained in the clear ink composition has, for example, a function of smoothing the ruggedness on the surface of a recorded image so as to improve the glossiness (OD), or a function of overcoating the surface of a recorded image so as to improve the durability.

Examples of the resin contained in the clear ink composition include well-known resins such as a urethane resin, an acrylic resin, a styrene-acrylic resin, a fluorene resin, a polyolefin resin, a rosin-modified resin, a terpene resin, a polyester resin, a polyamide resin, an epoxy resin, a vinyl chloride resin, a vinyl chloride-vinyl acetate copolymer, an ethylene-vinyl acetate resin, and an ionomer resin. The resin may be singly used or be used in combination of two or more types.

The resin contained in the clear ink composition is a resin which causes a volume of a calcium acetate aqueous solution of 0.085 mol/kg to be preferably equal to or greater than 5 mL is contained. The calcium acetate aqueous solution is required for aggregating a liquid of 3 mL, which contains the resin so as to have a content of 1 mass %. The required volume is more preferably equal to or greater than mL, further preferably greater than 7 mL, further more preferably equal to or greater than 8 mL, and particularly preferably equal to or greater than 9 mL. The upper limit value of the required volume is not particularly limited. However, a resin having the following upper limit values is preferably used. The upper limit value of the required volume is preferably equal to or smaller than 30 mL, more preferably equal to or smaller than 20 mL, further preferably equal to or smaller than 15 mL, and particularly preferably equal to or smaller than 10 mL. Because such a resin has significantly low reactivity with the above-described reagent, it is difficult that the resin contained in the clear ink composition, and the reagent react (aggregate or thicken) with each other in the recording region of the recording medium. Thus, it is possible to reduce an influence on the image quality of a recorded image which is formed with the colored ink composition, and to form a smooth overcoat on the surface of a recorded image.

The volume of the aqueous solution of 0.085 mol/kg calcium acetate, which is required for aggregating a liquid of 3 mL and contains the resin so as to have a content of 1 mass % in the resin contained in the clear ink composition is preferably greater than that in the resin contained in the colored ink composition, from a point of odor reduction, durability, or the like. The difference in the volume of the aqueous solution of 0.085 mol/kg calcium acetate between the resin contained in the clear ink composition and the resin contained in the colored ink composition is preferably equal to or greater than 2 mL, more preferably equal to or greater than 4 mL, and particularly preferably equal to or greater than 5 mL. The difference is not limited, but is preferably equal to or smaller than 15 mL, more preferably equal to or smaller than 13 mL, further preferably equal to or smaller than 9 mL, and particularly preferably equal to or smaller than 6 mL.

Such a resin having low reactivity is not particularly limited. However, it is preferable that (1) a nonionic resin, (2) a resin having an acid value which is smaller than 5 mgKOH/g, or (3) a resin dispersion of an emulsifier dispersion type is used.

As the resin contained in the clear ink composition, a resin having a glass transition temperature (Tg) which is equal to or higher than 0° C. is preferably contained, and a resin having a glass transition temperature (Tg) which is equal to or higher than 30° C. is more preferably contained. The upper limit value of Tg is not particularly limited. However, the upper limit value of Tg is preferably equal to or lower than 80° C., and more preferably equal to or lower than 60° C. The resin having a glass transition temperature (Tg) which is equal to or higher than 0° C. is contained, and thus it is possible to easily form a coating film, and good adhesion to the recording medium is obtained. In addition, the above-described heating process is performed at a temperature which is equal to or higher than Tg of the resin particle, and thus the resin particle has fluidity. Thus, a smooth overcoat may be formed on the surface of the recorded image. The glass transition temperature of the resin may be measured based on JIS K7121, by using differential scanning calorimetry (DSC method).

As a form of the resin, from a point of the above-described effects, a form of the resin particle is preferable. The average particle diameter of resin particles is preferably equal to or smaller than 200 nm, more preferably from 10 nm to 150 nm, and particularly preferably from 30 nm to 150 nm. If the average particle diameter of resin particles contained in the clear ink composition is in the above range, an effect of smoothing the ruggedness on the surface of a recorded image, which is generated by aggregation or thickening of the resin contained in the colored ink composition is exhibited more. Thus, it is possible to more improve the glossiness (OD) or the durability of a recorded image. The average particle diameter of the resin particles may be measured by a particle size distribution measuring apparatus which uses a laser diffraction scattering method as the principles for measuring. As the particle size distribution measuring apparatus, for example, a particle size analyzer (for example, "MICROTRAC UPA" manufactured by Nikkiso Co., Ltd.) which uses a dynamic light scattering method as the principles for measuring.

From a point of forming a sufficient overcoat on the surface of a recorded image, the lower limit value of the solid content of the resin is preferably equal to or greater than 0.5 mass %, more preferably equal to or greater than 1 mass %, and particularly preferably equal to or greater than 3 mass %, with respect to the total mass of the clear ink composition. From a point of storage stability or discharge stability of the clear ink composition, the upper limit value thereof is preferably equal to or smaller than 17 mass %, more preferably equal to or smaller than 15 mass %, further preferably equal to or smaller than 13 mass %, and particularly preferably equal to or smaller than 10 mass %.

Water

The clear ink composition used in the embodiment preferably uses water as the main solvent. The water is a component which adheres the clear ink composition to the recording region of the recording medium, and then is dried so as to be evaporated and scattered. The water which is preferably used is similar to the water described for the above-described colored ink composition. The content of the water contained in the clear ink composition may be set to be, for example, equal to or greater than 50 mass %, with respect to the total mass of the clear ink composition.

Organic Solvent

The clear ink composition used in the embodiment may contain an organic solvent. The organic solvent may apply the following functions to the ink: a function of improving wettability of the clear ink composition to the recording medium, or a function of preventing drying of the discharge head and improving discharge stability. As a specific example of the organic solvent, a solvent similar to the organic solvent exemplified in the above descriptions for the colored ink composition may be used. The content of the organic solvent is not particularly limited. However, the content of the organic solvent may be set to be, for example, from 1 mass % to 40 mass %, with respect to the total mass of the clear ink composition.

Surfactant

The clear ink composition used in the embodiment may contain a surfactant. The surfactant has, for example, a function of reducing surface tension of the clear ink composition and improving wettability for the recording medium. Among surfactants, for example, an acetylene glycol-based surfactant, a silicon-based surfactant, and a fluorine-based surfactant may be preferably used. As a specific example of the surfactant, a surfactant similar to a surfactant exemplified in the colored ink composition may be used. The content of the surfactant is not particularly limited. However, the content of the surfactant may be set to be, for example, from 0.1 mass % to 1.5 mass %, with respect to the total mass of the clear ink composition.

Other Components

The clear ink composition used in the embodiment may contain, if necessary, a pH adjuster, a corrosion inhibitor•antifungal agent, a rust inhibitor, a chelating agent, and the like. The coating film which is formed in the clear ink composition adhering process is preferably transparent. Thus, the coating film does not contain the colorant, normally.

1.4. Physical Properties of Each of Ink Compositions

The reaction liquid, the colored ink composition, and the clear ink composition which are used in the embodiment (also referred to as "ink compositions" in the specification) have surface tension at 20° C., which is preferably from 20 mN/m to 40 mN/m, and more preferably from mN/m to 35 mN/m, from a viewpoint of balance between image quality and reliability as an ink jet recording ink. The surface tension may be measured by using, for example, an automatic surface tension measuring device CBVP-Z (merchandise name, manufactured by Kyowa Interface Science Co., Ltd.), and may be measured by confirming surface tension when a platinum plate is wet with the ink under an environment of 20° C.

From the similar viewpoint, viscosity of each of the ink compositions at 20° C., which are used in the embodiment is preferably from 3 mPa·s to 10 mPa·s, and more preferably from 3 mPa·s to 8 mPa·s. The viscosity may be measured under an environment of 20° C. by using, for example, a viscoelasticity tester MCR-300 (merchandise name, manufactured by Pysica Corporation).

1.5. Ink Set

An ink set according to the embodiment is used in the above-described recording method. The ink set includes the reaction liquid, the colored ink composition, and the clear ink composition. Descriptions for a reaction liquid, a colored ink composition, and a clear ink composition which are included in the ink set according to the embodiment will be omitted because of having been already described in detail. The above-described recording method is performed by using the ink set according to the embodiment, and thus, it is possible to record an image on, particularly, an ink non-absorbable or ink low-absorbable recording medium, so as to be excellent in image quality and durability.

2. Recording Apparatus

An example of an image recording apparatus which can perform the above-described recording method according to the embodiment will be described with reference to the drawings. The image recording apparatus allowed to be used in the recording method according to the embodiment is not limited to the following form. That is, in the following form, a case where all of the processes are continuously performed in one line (in-line) will be described. However, the processes may be not performed in a line, but be performed intermittently.

FIGURE is a schematic diagram illustrating the image recording apparatus which can perform the recording method according to the embodiment. An image recording apparatus 100 includes a transportation unit 10, a reaction liquid adhering unit 20, a colored ink composition adhering unit 30, and a clear ink composition adhering unit 40. The transportation unit 10 transports a recording medium 1. The reaction liquid adhering unit 20 adheres the reaction liquid to the recording region of a recording medium. The colored ink composition adhering unit 30 adheres the colored ink composition to the recording region of the recording medium. The clear ink composition adhering unit 40 adheres the clear ink composition.

2.1. Transportation Unit

The transportation unit 10 may be configured by a roller 11, for example. The transportation unit 10 may include a plurality of rollers 11. A position at which the transportation unit 10 is provided or the number of transportation units 10 is not limited as long as a recording medium 1 can be transported. The transportation unit 10 may include a paper feeding roll, a paper feeding tray, an ejection roll, an ejection tray, and various platens, for example.

FIGURE illustrates a case where the recording medium 1 is a continuous object. However, even when the recording medium 1 is a single sheet, the transportation unit 10 is appropriately configured and thus such a recording medium may be transported.

2.2. Reaction Liquid Adhering Unit

The reaction liquid adhering unit 20 adheres the reaction liquid to the recording region of the recording medium 1 and applies the reagent contained in the reaction liquid to the recording region. The reaction liquid adhering unit 20 includes an ink jet recording head 21. The ink jet recording head 21 includes nozzles for discharging the reaction liquid. As a method of discharging the reaction liquid from the nozzles of the ink jet recording head 21, for example, the following methods are exemplified. Specifically, the following methods are exemplified: a method (electrostatic attraction method) in which a strong electric field is applied between nozzles and an acceleration electrode which is placed in the front of the nozzles, the reaction liquid of a droplet shape is continuously discharged from the nozzles, and droplets of the reaction liquid are discharged corresponding to a recording information signal when flying in a space between deflection electrodes; a method in which a small pump puts pressure on the reaction liquid, a nozzle is mechanically vibrated by a crystal resonator and the like, and thus droplets of the reaction liquid are forcibly discharged; a method (piezo-method) in which pressure by a piezoelectric element and a recording information signal are simultaneously applied to the reaction liquid, and thus droplets of the reaction liquid are discharged and recording is performed; and a method (thermal jet method) in which the resin liquid is heated and foamed by a minute electrode, in accordance with a recording information signal, and thus droplets of the reaction liquid are discharged and recording is performed. The reaction liquid adhering unit 20 is used in the reaction liquid adhering process of the recording method according to the embodiment.

FIGURE illustrates a case where an ink jet method is used for the reaction liquid adhering unit 20. However, it is not limited thereto, the case may be modified to be a form in which the above-described methods (for example, spray coating and roll coating) may be performed.

The reaction liquid adhered to a recording surface may be dried by a drying unit (not illustrated). In a case where the drying unit dries the reaction liquid, the drying unit may be provided on a downstream side of the reaction liquid adhering unit and on an upstream side of the colored ink composition adhering unit. The drying unit is not particularly limited as long as the drying unit has a configuration in which a liquid medium contained in the reaction liquid is promoted to be evaporated and scattered. For example, a unit of heating a recording medium, a unit of blowing to the reaction liquid, and a unit of combining the above units are exemplified. Specifically, forced air heating, radiant heating, conductive heating, public wave drying, microwave drying, and the like are preferably used.

2.3. Colored Ink Composition Adhering Unit

The colored ink composition adhering unit 30 adheres droplets of the colored ink composition to the recording region to which the reaction liquid has adhered, so as to form a recorded image. The colored ink composition adhering unit 30 includes an ink jet recording head 31. The ink jet recording head 31 includes nozzles for discharging the colored ink composition. A method of discharging the colored ink composition from the nozzles of the ink jet recording head 31 is similar to the method described for the reaction liquid adhering unit 20. The colored ink composition adhering unit 30 is used in the colored ink composition adhering process of the recording method according to the embodiment.

2.4. Clear Ink Composition Adhering Unit

The clear ink composition adhering unit 40 adheres the clear ink composition to the recording surface of the recording medium 1, so as to form an overcoat which is formed from a resin. The clear ink composition adhering unit 40 includes an ink jet recording head 41. The ink jet recording head 41 includes nozzles for discharging the clear ink composition. The clear ink composition adhering unit 40 is used in the clear ink composition adhering process of the recording method according to the embodiment.

In FIGURE, the clear ink composition adhering unit is provided on a downstream side of the colored ink composition adhering unit 30. However, the colored ink composition adhering unit 30 and the clear ink composition adhering unit 40 may be simultaneously performed. That is, the colored ink composition and the clear ink composition may be discharged when the same treatment is performed. Here, "discharge when the same treatment is performed" means that droplets of both of one ink and another ink are discharged at a timing when the droplets of both of the inks can be mixed. For example, in a serial printer, the colored ink composition and the clear ink composition may be landed in the same region by the same scanning.

FIGURE illustrates a case where an ink jet method is used for the clear ink composition adhering unit 40. However, it is not limited thereto, the case may be modified to be a form in which the above-described methods (for example, spray coating and roll coating) may be performed. In a case where the colored ink composition and the clear ink composition are discharged when the same treatment is performed, a state where the colored ink composition and the clear ink composition are mixed in the recording region is obtained. However, since the reactivity between the resin contained in the clear ink composition, and the reagent is low, the effects of the invention are sufficiently obtained.

2.5. Ink jet recording head

In a case where an ink jet recording head is used in the reaction liquid adhering unit 20, the colored ink composition adhering unit 30, and the clear ink composition adhering unit 40 which are described above, any of an ink jet recording apparatus which includes a serial type recording head, an ink jet recording apparatus which includes a line type recording head may be used.

The ink jet recording apparatus which includes the serial type recording head performs recording by performing scanning (path) of discharging the ink composition a plurality number of times while the recording head is moved relatively to a recording medium. As a specific example of the serial type recording head, a recording head installed in a carriage which moves in a width direction of a recording medium (a direction intersecting with a transporting direction of the recording medium) and discharges droplet on the recording medium by moving the recording head with moving the carriage is exemplified.

The ink jet recording apparatus which includes the line type recording head performs recording by performing scanning (path) of discharging the ink composition one time while the recording head is moved relatively to a recording medium. As a specific example of the line type recording head, a recording head which is formed so as to be wider than the width of a recording medium, and discharges droplet on the recording medium without moving the recording head is exemplified.

In a case where the clear ink composition adhering unit 40 is provided subsequent to the colored ink composition adhering unit 30, in a multi-path recording by using the serial type recording head, the colored ink composition completes to adhere to a unit recording region of a length by sub-scanning which is performed at an interval of a path (main scanning), and then adhering of the clear ink composition is performed. In one-path recording method using the line type recording head, a clear ink head is disposed on a downstream side of a coloring ink head in a scanning direction. In a case where the colored ink composition adhering unit 30 and the clear ink composition adhering unit 40 are simultaneously performed, in the multi-path recording method by using the serial type recording head, the clear ink composition is caused to adhere to the unit recording region after adhering of the colored ink composition is started and before adhering of the colored ink composition is completed. From a point of obtaining a recorded image which is more excellent in image quality and durability, a form in which the clear ink composition adhering unit 40 is provided subsequent to the colored ink composition adhering unit 30 is preferable.

2.6. Drying Unit

In the image recording apparatus 100, a drying unit 50 may be provided subsequent to the colored ink composition adhering unit 30 and the clear ink composition adhering unit 40. The drying unit 50 is provided, and thus it is possible to rapidly evaporate and scatter a liquid medium from the colored ink composition and the clear ink composition which have been adhered to the recording medium, and to rapidly form a recorded image or an overcoat. A drying unit which may be employed as the drying unit 50 is similar to the unit described for the above reaction liquid adhering unit 20.

In a case where a recorded image is dried in a manner of air drying, the drying unit 50 may not be provided in the image recording apparatus 100.

3. Examples

The embodiment of the invention will be specifically described below by using examples. However, the embodiment is not limited to only the examples.

3.1. Preparation of Ink Compositions

Preparation of Reaction Liquid

After components were mixed and stirred so as to have a mixing ratio in Table 1, the obtained mixture was filtered by using a membrane filter of 10 μm, and thereby reaction liquids (H1 and H2) were prepared. All numeric values in Table 1 indicate mass %. Ion exchange water was added so as to cause the total mass of each of the reaction liquids to be 100 mass %.

Preparation of Colored Ink Composition

After components were mixed and stirred so as to have a mixing ratio in Table 1, the obtained mixture was filtered by using a membrane filter of 10 μm, and thereby colored ink compositions (C1 to C3) were prepared. All numeric values in Table 1 indicate mass %. Ion exchange water was added so as to cause the total mass of each of the colored ink compositions to be 100 mass %.

Preparation of Clear Ink Composition

After components were mixed and stirred so as to have a mixing ratio in Table 1, and thereby clear ink compositions (CL1 to CL5) were prepared. All numeric values in Table 1 indicate mass %. Ion exchange water was added so as to cause the total mass of each of the clear ink compositions to be 100 mass %.

Aggregation Property Test of Resin

Mixing and stirring was performed while a calcium nitrate aqueous solution of 0.085 mol/kg was dropped into a resin liquid of 3 mL which contained the resin shown in Table 1 so as to be 1 mass %. It was visually confirmed whether or not sediment was generated in a liquid mixture. The volume of the calcium nitrate aqueous solution of 0.085 mol/kg, which is required for aggregation of the resin is also shown in Table 1.

Composition and Physical Property of Ink Compositions

The composition and physical properties of each ink composition obtained in the above descriptions are shown in the following Table. 1.

TABLE 1

| | Composition No. | Volume of reaction liquid required for aggregation (mL) | Average particle diameter (nm) | Tg (° c.) | Reaction liquid | | Colored ink composition | | | Clear ink composition | | | | |
|---|---|---|---|---|---|---|---|---|---|---|---|---|---|---|
| | | | | | H1 | H2 | C1 | C2 | C3 | CL1 | CL2 | CL3 | CL4 | CL5 |
| Reagent | Calcium acetate-monohydrate | — | — | — | 15 | 0 | 0 | 0 | 0 | 0 | 0 | 0 | 0 | 0 |
| | Calcium nitrate-tetrahydrate | — | — | — | 0 | 19 | 0 | 0 | 0 | 0 | 0 | 0 | 0 | 0 |
| Coloring material | Black pigment | — | — | — | 0 | 0 | 4 | 4 | 4 | 0 | 0 | 0 | 0 | 0 |
| Surfactant | Silicon-based surfactant | — | — | — | 0.6 | 0.6 | 0.6 | 0.6 | 0.6 | 0.6 | 0.6 | 0.6 | 0.6 | 0.6 |
| Resin | Polyethylene resin A | 0.5 | 50 | 60 | 0 | 0 | 1 | 0 | 0 | 5 | 0 | 0 | 0 | 0 |
| | Polyethylene resin B | 5 | 50 | 60 | 0 | 0 | 0 | 1 | 0 | 0 | 5 | 0 | 0 | 0 |
| | Polyester resin | 9 | 50 | 60 | 0 | 0 | 0 | 0 | 1 | 0 | 0 | 5 | 0 | 0 |

TABLE 1-continued

| | | Volume of reaction liquid required for aggregation (mL) | Average particle diameter (nm) | Tg (°C) | Reaction liquid | | Colored ink composition | | | Clear ink composition | | | | |
|---|---|---|---|---|---|---|---|---|---|---|---|---|---|---|
| Composition No. | | | | | H1 | H2 | C1 | C2 | C3 | CL1 | CL2 | CL3 | CL4 | CL5 |
| | Ethylene-vinyl acetate resin | 5 | 100 | −30 | 0 | 0 | 0 | 0 | 0 | 0 | 0 | 0 | 5 | 0 |
| | Ionomer resin | 5 | 400 | 40 | 0 | 0 | 0 | 0 | 0 | 0 | 0 | 0 | 0 | 5 |
| Solvent | 1,2-hexane diol | — | — | — | 3 | 3 | 3 | 3 | 3 | 3 | 3 | 3 | 3 | 3 |
| | Propylene glycol | — | — | — | 15 | 15 | 10 | 10 | 10 | 10 | 10 | 10 | 10 | 10 |
| | Water | — | — | — | Remaining | Remaining | Remaining | Remaining | Remaining | Remaining | Remaining | Remaining | Remaining | Remaining |
| Total | | — | — | — | 100 | 100 | 100 | 100 | 100 | 100 | 100 | 100 | 100 | 100 |
| Reagent content (mol/kg) | | — | — | — | 0.85 | 0.81 | — | — | — | — | — | — | — | — |

Components which are shown in Table 1 other than the names of compounds are as follows.

Coloring Material
  Black pigment (carbon black)
Surfactant
  Silicon-based surfactant (merchandise name "BYK-348", manufactured by BYK-Chemie Japan Corporation)
Resin
  Polyethylene resin A (merchandise name "AQUASER507", manufactured by BYK-Chemie Japan Corporation, average particle diameter: 50 nm, Tg: 60° C.)
  Polyethylene resin B (merchandise name "AQUASER515", manufactured by BYK-Chemie Japan Corporation, average particle diameter: 50 nm, Tg: 60° C.)
  Polyester resin (merchandise name "ESTER KT-8701", manufactured by Unitika Ltd., average particle diameter: 50 nm, Tg: 60° C.)
  Ethylene-vinyl acetate resin (merchandise name "EVAF-LEX EV170", manufactured by Du pont-Mitsui Polychemicals Co., Ltd., average particle diameter: 100 nm, Tg: −30° C.)
  Ionomer resin (merchandise name "CHEMIPEARL S300", manufactured by Mitsui Chemicals, Inc., average particle diameter: 400 nm, Tg: 40° C.)

3.2. Recording Method

A recording medium (merchandise name "CAST 73", manufactured by Daio Paper Corporation, low-absorbable coated paper) was entered into PX-G930 (manufactured by Seiko Epson Corp.). Then, a test pattern having a size of 3 cm×3 cm on the recording medium was set as a recording region. The reaction liquid with an adhering amount of 1 mg/inch$^2$ (adhering amount of 0.4 mg/inch$^2$ in Example 12) was adhered to the recording region by an ink jet method. After adhering was completed, the recording medium was reversely sent, and then was left for a period shown in Tables 2 to 4 (wait for a period (seconds) between adhering of the reaction liquid and adhering of the colored ink). Then, the colored ink composition with an adhering amount of 6 mg/inch$^2$ was adhered to the recording region by the ink jet method. After adhering was completed, the recording medium was reversely sent, and then the clear ink composition with an adhering amount of 1 mg/inch$^2$ was adhered to the recording region of the recording medium by the ink jet method. The recording resolution was set to 720×720 dpi. After all adhering processes were completed, the ejected recording medium was heated and dried at 50° C. for 20 minutes, and thereby a record was obtained. When coating with each of the ink compositions was performed by using PX-G930, the surface temperature of the recording medium was set to 25° C.

3.3. Evaluation Test

Solid Unevenness·Bleeding Image

Regarding the record obtained in the above-described manner, solid unevenness·bleeding was visually confirmed, and was evaluated based on the following evaluation criteria.

Evaluation Criteria

A: there is no unevenness in the pattern. There is no bleeding around the pattern. The image is very good.

B: there is no unevenness in the pattern. There is bleeding around the pattern. The image is good.

C: there is significantly much unevenness in the pattern. The image is poor.

OD

Optical density (OD) of the record obtained in the above-described manner was measured by using an OD measuring machine (device name "Spectrolino", manufactured by GretagMacbeth Corporation), and was evaluated based on the following evaluation criteria. Since an OD value is increased as glossiness becomes higher in the OD measuring machine, evaluation of OD may be expressed as evaluation of glossiness.

Evaluation Criteria

A: being equal to or greater than 2.1

B: being equal to or greater than 1.9 and smaller than 2.1

C: being smaller than 1.9

Odor

Odor of the record obtained in the above-described manner was directly snuffed, and was evaluated based on the following evaluation criteria.

Evaluation Criteria

A: it does not smell. The record is very good.

B: odor is felt slightly. The record is good.

C: Odor is significantly felt. The record is poor.

Durability

Regarding the record obtained in the above-described manner, durability was evaluated by using a Gakushin-type color rubbing fastness tester (device name "AB-301", manufactured by TESTER SANGYO CO., Ltd.). Specifically, the recording region in which an image was recorded was rubbed with a friction object having an attached white cotton fabric (based on JIS L 0803). The rubbing was repeated 100 times with a load of 500 g.

Evaluation Criteria

A: the white cotton fabric is contaminated, but an image is not peeled off. The record is very good.

B: it is confirmed that an image is slightly peeled off (so as to be smaller than 20%). The record is good.

C: an image is significantly peeled off (20% or more). The record is poor.

3.4. Evaluation Results

Examples 1 to 12 and Comparative Examples 1 to 7 were performed based on the recording method and the evaluation test. Recording methods and Evaluation results of Examples 1 to 12 and Comparative Examples 1 to 7 are shown in the following Tables 2 to 4.

TABLE 2

| | Example 1 | | | Example 2 | | | Example 3 | | | Example 4 | | | Example 5 | | | Example 6 | | |
|---|---|---|---|---|---|---|---|---|---|---|---|---|---|---|---|---|---|---|
| | Reaction liquid | Colored ink | Clear ink | Reaction liquid | Colored ink | Clear ink | Reaction liquid | Colored ink | Clear ink | Reaction liquid | Colored ink | Clear ink | Reaction liquid | Colored ink | Clear ink | Reaction liquid | Colored ink | Clear ink |
| Composite | H1 | C1 | CL1 | H1 | C1 | CL2 | H1 | C1 | CL3 | H2 | C1 | CL2 | H1 | C1 | CL3 | H1 | C1 | CL4 |
| Resin particle diameter (nm) | — | 50 | 50 | — | 50 | 50 | — | 50 | 50 | — | 50 | 50 | — | 50 | 50 | — | 50 | 100 |
| Resin Tg (° C.) | — | 60 | 60 | — | 60 | 60 | — | 60 | 60 | — | 60 | 60 | — | 60 | 60 | — | 60 | −30 |
| Cohesive force of resin (required amount ml of Ca acetate) | — | 0.5 | 0.5 | — | 0.5 | 5 | — | 0.5 | 9 | — | 0.5 | 5 | — | 0.5 | 9 | — | 0.5 | 5 |
| Wait (seconds) between reaction liquid and colored ink | | 5 | | | 5 | | | 5 | | | 5 | | | 30 | | | 5 | |
| Solid image quality (bleeding) | | A | | | A | | | A | | | A | | | B | | | A | |
| OD | | B | | | B | | | A | | | B | | | B | | | B | |
| Odor | | A | | | A | | | B | | | A | | | B | | | A | |
| Durability | | B | | | A | | | A | | | B | | | A | | | B | |

TABLE 3

| | Example 7 | | | Example 8 | | | Example 9 | | | Example 10 | | | Example 11 | | | Example 12 | | |
|---|---|---|---|---|---|---|---|---|---|---|---|---|---|---|---|---|---|---|
| | Reaction liquid | Colored ink | Clear ink | Reaction liquid | Colored ink | Clear ink | Reaction liquid | Colored ink | Clear ink | Reaction liquid | Colored ink | Clear ink | Reaction liquid | Colored ink | Clear ink | Reaction liquid | Colored ink | Clear ink |
| Composite | H1 | C1 | CL5 | H1 | C2 | CL1 | H1 | C2 | CL2 | H1 | C2 | CL3 | H2 | C2 | CL2 | H1 | C1 | CL1 |
| Resin particle diameter (nm) | — | 50 | 400 | — | 50 | 50 | — | 50 | 50 | — | 50 | 50 | — | 50 | 50 | — | 50 | 50 |
| Resin Tg (° C.) | — | 60 | 40 | — | 60 | 60 | — | 60 | 60 | — | 60 | 60 | — | 60 | 60 | — | 60 | 60 |
| Cohesive force of resin (required amount ml of Ca acetate) | — | 0.5 | 5 | — | 5 | 0.5 | — | 5 | 5 | — | 5 | 9 | — | 5 | 5 | — | 0.5 | 0.5 |
| Wait (seconds) between reaction liquid and colored ink | | 5 | | | 5 | | | 5 | | | 5 | | | 5 | | | 5 | |
| Solid image quality (bleeding) | | A | | | B | | | B | | | B | | | B | | | B | |
| OD | | C | | | B | | | B | | | A | | | B | | | A | |
| Odor | | A | | | A | | | B | | | B | | | A | | | A | |
| Durability | | A | | | B | | | A | | | A | | | B | | | A | |

TABLE 4

| | Comparative Example 1 | | Comparative Example 2 | | Comparative Example 3 | | | Comparative Example 4 | | | Comparative Example 5 | | | Comparative Example 6 | | Comparative Example 7 | | |
|---|---|---|---|---|---|---|---|---|---|---|---|---|---|---|---|---|---|---|
| | Reaction liquid | Colored ink | Reaction liquid | Colored ink | Reaction liquid | Colored ink | Clear ink | Reaction liquid | Colored ink | Clear ink | Reaction liquid | Colored ink | Clear ink | Reaction liquid | Colored ink | Reaction liquid | Colored ink | Clear ink |
| Composite | H1 | C1 | H1 | C2 | H1 | C3 | CL1 | H1 | C3 | CL2 | H1 | C3 | CL3 | H1 | C2 | H2 | C3 | CL2 |
| Resin particle diameter (nm) | — | 50 | — | 50 | — | 50 | 50 | — | 50 | 50 | — | 50 | 50 | — | 50 | — | 50 | 50 |
| Resin Tg (° C.) | — | 60 | — | 60 | — | 60 | 60 | — | 60 | 60 | — | 60 | 60 | — | 60 | — | 60 | 60 |
| Cohesive force of resin (required amount ml of Ca acetate) | — | 0.5 | — | 5 | — | 9 | 0.5 | — | 9 | 5 | — | 9 | 9 | — | 5 | — | 9 | 5 |
| Wait (seconds) between reaction liquid and colored ink | 5 | | 5 | | 5 | | | 5 | | | 5 | | | 5 | | 5 | | |
| Solid image quality (bleeding) | A | | B | | C | | | C | | | C | | | C | | C | | |
| OD | C | | C | | B | | | A | | | A | | | B | | A | | |
| Odor | B | | C | | B | | | B | | | C | | | C | | A | | |
| Durability | C | | C | | B | | | A | | | A | | | C | | B | | |

According to the recording method of Example 1 to shown in Tables 2 and 3, it was determined that a recorded image which was excellent in image quality and durability was allowed to be recorded. In Example 7, since CL5 which contained an ionomer resin having an average particle diameter of 400 nm was used as the clear ink composition, the effect of smoothing ruggedness on the surface of a recorded image, which was generated by aggregation or thickening of the resin contained in the colored ink composition, by using an overcoat was reduced, and glossiness (OD) was deteriorated. In Example 12, the adhering amount of the reaction liquid was set to be smaller than 0.4 mg/inch$^2$ and that in other examples. However, a tendency of improving the durability by the small adhering amount was confirmed. Thus, it was presumed that the reagent has a tendency of peeling off an interface between the ink-coated film and the recording medium. In addition, it was determined that the adhering amount of the reaction liquid was preferably set to have the required smallest value.

As in the recording methods of Comparative Examples 1, 2, and 6, which are shown in Table 4, in a case where the clear ink composition adhering process was not provided, the overcoat was not formed. Thus, it was determined that glossiness (OD) or durability of a recorded image was deteriorated.

As in the recording methods of Comparative Examples 3 to 5, and 7, which are shown in Table 4, in a case where the resin contained in the colored ink composition had low reactivity with the reagent, it was determined that image quality of a solid image was deteriorated.

The invention is not limited to the above-described embodiment, and various modifications may be applied. For example, the invention includes a configuration (for example, configuration having the same function, the same method, and the same results, or configuration having the same object and the same effects) which is substantially the same as the configuration described in the embodiment. The invention includes a configuration obtained by substituting a component which is not fundamental component in the configuration described in the embodiment. The invention includes a configuration which can exhibit the same advantages effects the same as those of the configuration described in the embodiment, or can achieve the same object. The invention includes a configuration obtained by adding well-known technologies to the configuration described in the embodiment.

The entire disclosures of Japanese Patent Application Nos. 2015-077473, filed Apr. 6, 2015 and 2015-158713, filed Aug. 11, 2015 are expressly incorporated by reference herein.

What is claimed is:

1. A recording method comprising:
   adhering a reaction liquid to a recording region of a recording medium, the reaction liquid containing a reagent which causes aggregation or thickening of a colored ink composition;
   adhering the colored ink composition to the recording region to which the reaction liquid has been adhered, the colored ink composition containing a resin and a coloring material; and
   adhering a clear ink composition which contains a resin, to the recording region to which the reaction liquid has been adhered,
   wherein
   a resin which causes a volume of a calcium acetate aqueous solution of 0.085 mol/kg to be equal to or smaller than 7 mL is contained as the resin contained in the colored ink composition, the calcium acetate aqueous solution being required for aggregating a liquid of 3 mL, which contains the resin so as to have a content of 1 mass %.

2. The recording method according to claim 1, wherein
   a resin which causes a volume of a calcium acetate aqueous solution of 0.085 mol/kg to be equal to or greater than 5 mL is contained as the resin contained in the clear ink composition, the calcium acetate aqueous solution being required for aggregating a liquid of 3 mL, which contains the resin so as to have a content of 1 mass %.

3. The recording method according to claim 1, wherein a resin in which a glass transition temperature is equal to or higher than 0° C. is contained as the resin contained in the clear ink composition.

4. The recording method according to claim 1, wherein an average particle diameter in the resin contained in the clear ink composition is equal to or smaller than 200 nm.

5. The recording method according to claim 1, wherein adhering of the colored ink composition is started within 20 seconds from the completion of the reaction liquid adhering.

6. The recording method according to claim 1, wherein the maximum adhering amount of the reaction liquid to the recording region is from 0.2 mg/inch$^2$ to 3 mg/inch$^2$.

7. The recording method according to claim 1, wherein at least one selected from a group of multivalent metal salts and organic acids is contained as the reagent.

8. The recording method according to claim 1, wherein the content of the resin contained in the colored ink composition is from 0.5 mass % to 13 mass %,
the content of the resin contained in the clear ink composition is from 1 mass % to 17 mass %, and
the content of the reagent contained in the reaction liquid is from 0.1 mol/kg to 1.5 mol/kg.

9. The recording method according to claim 1, wherein the volume of the calcium acetate aqueous solution for the resin contained in the clear ink composition is larger than the volume of the calcium acetate aqueous solution for the resin contained in the colored ink composition, the volume of the calcium acetate aqueous solution of 0.085 mol/kg being required for aggregating the liquid of 3 mL which contains the corresponding resin so as to have a content of 1 mass %.

10. The recording method according to claim 1, wherein each of the colored ink composition and the clear ink composition is discharged from an ink jet recording head and adhered to the recording medium.

11. An ink set which comprises the reaction liquid, the colored ink composition, and the clear ink composition in order to be used in the recording method according to claim 1.

12. An ink set which comprises the reaction liquid, the colored ink composition, and the clear ink composition in order to be used in the recording method according to claim 2.

13. An ink set which comprises the reaction liquid, the colored ink composition, and the clear ink composition in order to be used in the recording method according to claim 3.

14. An ink set which comprises the reaction liquid, the colored ink composition, and the clear ink composition in order to be used in the recording method according to claim 4.

15. An ink set which comprises the reaction liquid, the colored ink composition, and the clear ink composition in order to be used in the recording method according to claim 5.

16. An ink set which comprises the reaction liquid, the colored ink composition, and the clear ink composition in order to be used in the recording method according to claim 6.

17. An ink set which comprises the reaction liquid, the colored ink composition, and the clear ink composition in order to be used in the recording method according to claim 7.

18. An ink set which comprises the reaction liquid, the colored ink composition, and the clear ink composition in order to be used in the recording method according to claim 8.

19. An ink set which comprises the reaction liquid, the colored ink composition, and the clear ink composition in order to be used in the recording method according to claim 9.

20. An ink set which comprises the reaction liquid, the colored ink composition, and the clear ink composition in order to be used in the recording method according to claim 10.

* * * * *